Patented Sept. 20, 1932

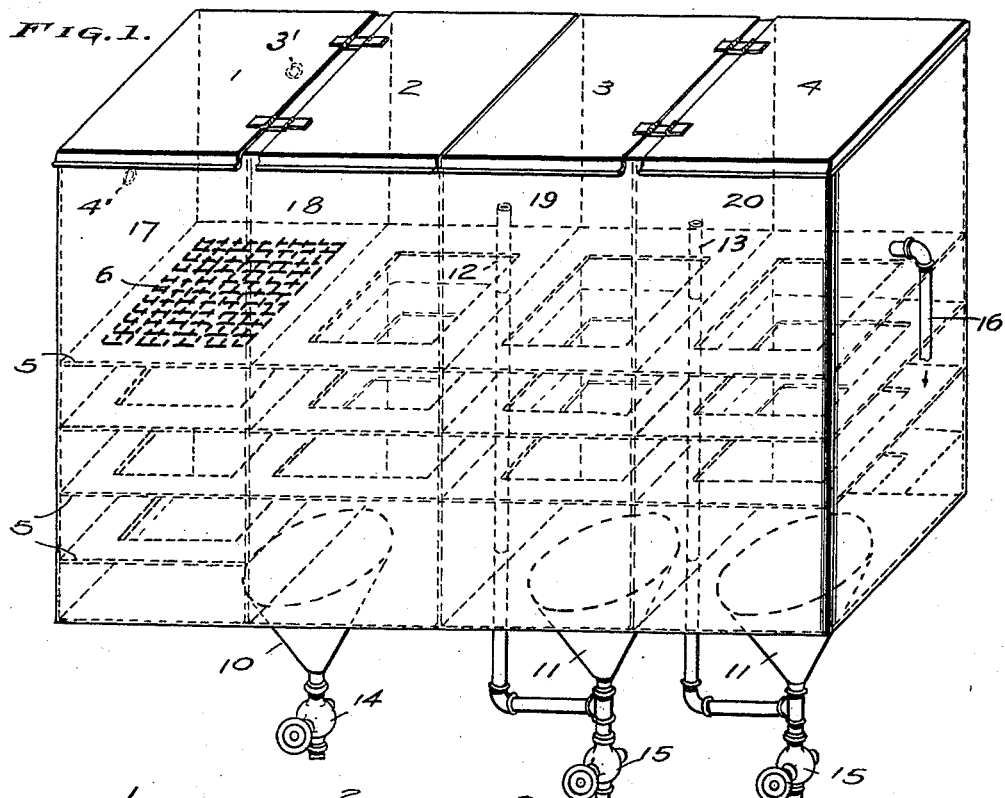
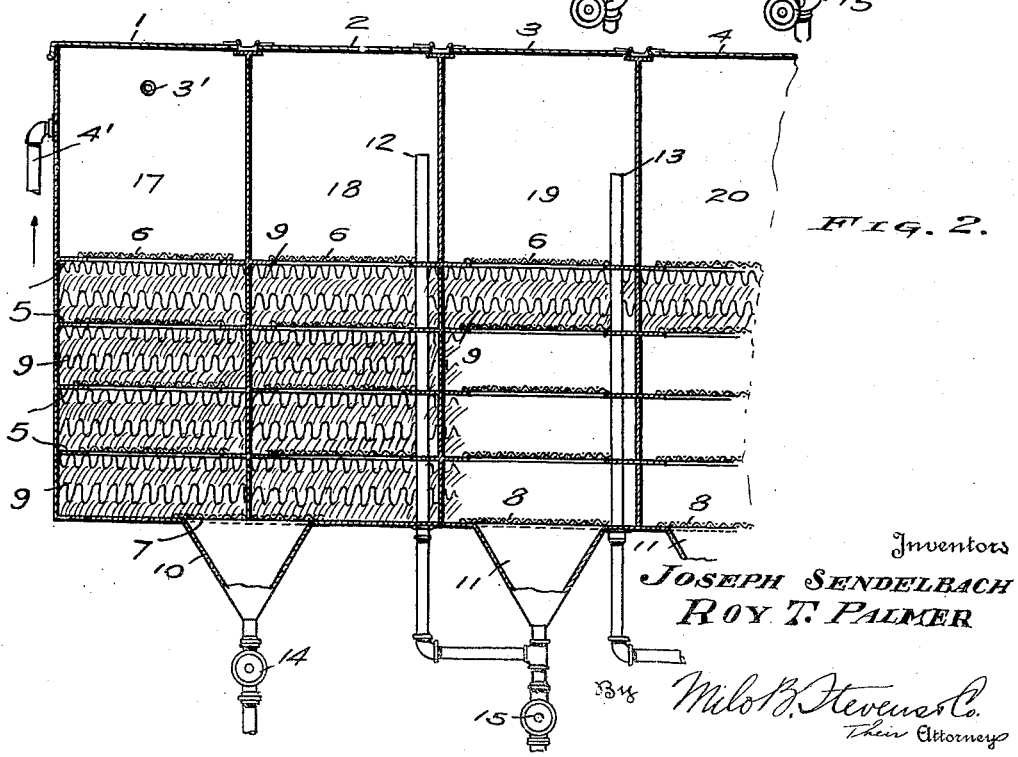

1,878,720

UNITED STATES PATENT OFFICE

JOSEPH SENDELBACH AND ROY T. PALMER, OF McALESTER, OKLAHOMA

APPARATUS FOR TREATING GASOLINE

Application filed November 25, 1927. Serial No. 235,580.

Our invention relates to a process and apparatus for treating gasoline which has been used as a cleaning agent for fabrics, clothing and the like, for the separation of water, dirt, grease and foreign matter therefrom by mechanical and chemical means whereby the gasoline is recovered in a pure state and revivified.

Objects of the invention are: the provision of a novel process for treating gasoline of the character noted to effect the cleansing and revivifying thereof by mechanical as well as chemical means; and the provision of a novel apparatus for carrying out the process.

In carrying out the process we make use of an apparatus consisting of a plurality of serially arranged containers provided with filtration means and arranged for chemically treating gasoline passed therethrough. We have herein shown and described one practical, physical embodiment of the principles of our invention, and it is to be understood that the disclosure is not a limitation to the details specified, but that any desired changes and modifications may be made in details thereof as will fall within the scope of the invention as claimed. In the drawing:—

Figure 1 is an isometric perspective of an apparatus for carrying out the process.

Figure 2 is a fragmentary vertical sectional view through the apparatus as shown in Figure 1.

The preferred embodiment of apparatus comprises a plurality of tanks 17, 18, 19 and 20 arranged side by side serially as a battery or unit, and having hinged covers or lids 1, 2, 3 and 4 respectively through which access may be had to the interiors thereof. Within each of the tanks are disposed a plurality of parallel vertically spaced shelves 5 supporting reticulated plates 6 which form openwork supports for a plurality of filter pads 9, which pads are made of burlap woven jute or hemp fiber and are packed between the plates 6 in layers, each layer being crimped transversely of the tanks, as best shown in Figure 2.

Each of the tanks 17 and 18 have a bottom opening communication with a conical drain receptacle 10, the bottom openings being covered by a strainer plate 7. Discharge from the receptacle 10 may be had by way of the valve 14 as desired. It will be apparent that between the tanks 17 and 18 the sole communication is through the receptacle 10. The first tank of the series, 17, is provided with an overflow drain 3' spaced considerably above the uppermost shelf 5, and an inlet pipe 4' communicates with the tank at a point slightly below the said overflow drain.

Each of the tanks 19 and 20 have disposed therebeneath a conical receptacle 11 similar to the receptacle 10, which may be drained through the valves 15, one of which is shown. Strainer plates 8 are provided in the bottom opening of each tank leading to these receptacles 11.

The second tank 18 of the series is provided with a vertical pipe 12 leading from the bottom of the next adjacent receptacle 11 above its valve 15 and extending up through the bottom of the tank and opening at its upper end approximately one inch lower than the level of the inlet pipe 4' in tank 17. Similarly, the third tank 19 of the series is provided with a pipe 13 leading from the bottom of the next adjacent receptacle 11 and opening at a point approximately one inch below the top of the pipe 12. The outlet for the unit comprises the pipe 16 leading from the tank 20 at a level approximately one inch below the level of the top of pipe 13 in tank 19.

In carrying out the process of cleaning and revivifying gasoline which has been used for cleaning purposes, the receptacles 11 are filled, through the pipes 12 and 13, with a liquid composition comprising a solution of caustic potash, powdered alum and oil of eucalyptus in alcohol. The dirty gasoline is then introduced through the inlet 4' and allowed to filter down through the pads 9 in the tank 17 to the receptacle 10 and thence upwardly in the tank 18 through the filter pads 9. In this stage of the process the receptacle 10 serves as a settling basin wherein water contained in the gasoline settles out and may be drained off by manipulation of the valve 14. From the tank 18 the gasoline flows through the pipe 12 rising through the solution in the receptacle 11 and up through the filtration pads 9 to the pipe 13 in tank 19 and down through this pipe to the bottom of the next adjacent receptacle 11 rising through the solution therein and up through the filtration pads in the tank 20 to discharge through the outlet 16.

In its passage through the solution in the receptacles 11, and by reason of the conical formation of these receptacles, the gasoline expands and mixes intimately with the solution being thoroughly washed thereby and revivified. The solution has the property of congealing and precipitating the grease, dirt and foreign matter remaining in the gasoline after its preliminary treatment in the tanks 17 and 18 and settling basin 10. At the same time some of the composition enters into solution in the gasoline thereby strengthening and enhancing its strength as a cleaning agent. For this reason, and due to loss by draining off sediment from the valves 14 and 15, it becomes necessary from time to time to renew the solution in the receptacles 11, which may be done by filling through the pipes 12 and 13.

The crimped arrangement of the filter pads 9 insures a free flow of the gasoline at all times, effectively preventing any clogging, and at the same time efficiently filtering substantial amounts of foreign matter therefrom. As after the initial filtration stage in the tank 17, the gasoline is caused to pass upwardly through successive filters, the filtration action is materially increased, and this mechanical cleansing in combination with the chemical action of the solution employed, insures the recovery of thoroughly cleaned and revivified gasoline from the unit outlet 16. It is obvious that successive batteries of units may be employed as desired, and the number of tanks in each unit may be diminished or increased without departing from the principles of our invention.

We claim:

An apparatus for cleaning gasoline comprising a plurality of serially arranged tanks, filtering means in said tanks, an inlet leading to the first tank, an outlet leading from the last tank and disposed below the level of said inlet, receptacles disposed beneath said tanks for receiving chemical cleansing material, the first and second of said tanks having communication through the top portion of one of said receptacles arranged common to both so as to allow common settling therefrom to its bottom portion, a communication pipe leading from the second tank from above the filtering means therein to the bottom of the receptacle on the third tank, and communication means between the other tanks of the series.

In testimony whereof we affix our signatures.

JOSEPH SENDELBACH.
ROY T. PALMER.